United States Patent [19]

Satterwhite et al.

[11] Patent Number: 4,467,833
[45] Date of Patent: Aug. 28, 1984

[54] CONTROL VALVE AND ELECTRICAL AND HYDRAULIC CONTROL SYSTEM

[75] Inventors: Lawrence E. Satterwhite; Lawrence F. Angelo, both of Conroe, Tex.

[73] Assignee: NL Industries, Inc., New York, N.Y.

[21] Appl. No.: 301,002

[22] Filed: Sep. 10, 1981

Related U.S. Application Data

[63] Continuation of Ser. No. 73,581, Sep. 7, 1979, abandoned.

[30] Foreign Application Priority Data

Oct. 11, 1977 [GB] United Kingdom .............. 42314/77

[51] Int. Cl.³ ..................... E21B 43/01; F16K 31/143
[52] U.S. Cl. ...................................... 137/637; 251/31; 251/63.4; 91/426; 92/151; 92/152
[58] Field of Search ................... 251/63.4, 31; 92/151, 92/152; 91/426; 137/637

[56] References Cited

U.S. PATENT DOCUMENTS

| | | | |
|---|---|---|---|
| 3,547,156 | 12/1970 | Cockeram | 251/31 X |
| 3,650,506 | 3/1972 | Bruton | 251/63.4 X |
| 3,827,668 | 8/1974 | De Vries et al. | 251/63.4 X |
| 3,981,478 | 9/1976 | Lundsgart | 251/29 |
| 3,993,100 | 11/1976 | Pollard et al. | 137/637 X |
| 4,010,928 | 3/1977 | Smith | 251/31 |
| 4,029,290 | 6/1977 | Karpenko | 251/63.4 X |

*Primary Examiner*—Arnold Rosenthal
*Attorney, Agent, or Firm*—Browning, Bushman, Zamecki & Anderson

[57] ABSTRACT

A control valve and a multiple control system therefor for controlling a plurality of remotely positioned hydraulically actuated underwater devices. The control valve includes first and second equal size pilot pistons acted upon by first and second pilot ports, respectively, for moving the valve to either an open or closed position, and third and fourth unequal size pilot pistons acted upon by third and fourth pilot ports for moving the valve to either an open or closed position. The control valve may be operated in an electro-hydraulic control mode by the use of electrically actuated valves controlling the supply of fluid to the first and second ports. In addition, the control valve can be operated in a hydraulic mode by hydraulically controlling the supply of fluid to the third and fourth pilot ports.

3 Claims, 4 Drawing Figures

CONTROL VALVE AND ELECTRICAL AND HYDRAULIC CONTROL SYSTEM

This is a continuation of application Ser. No. 073,581 filed Sept. 7, 1979 and now abandoned.

BACKGROUND OF THE INVENTION

Underwater hydraulic control valves, such as used in controlling production or drilling equipment in underwater wells, such as shown in U.S. Pat. No. 3,993,100, is old.

The present invention is directed to various improvements, one of which is a hydraulically actuated control valve, and another of which is an improved control system utilizing the improved valve in which the control system may be actuated by various control modes. The present invention is directed to a control system and improved control valve in which the control valve is operated in both an electro-hydraulic control mode and a hydraulic mode for operating underwater equipment. The use of an electrical control system provides a faster actuating control system and the use of solenoid actuated pilot valves allows the use of minimum electrical power. In addition, a hydraulic backup control system is used to insure that the control valves may be operated in the event of a failure in the electrohydraulic control system.

SUMMARY

The present invention is generally directed to an improved hydraulically actuated control valve and control system for controlling a plurality of hydraulically actuated underwater devices. The control valve includes a body with a valve element movably positioned between an inlet and outlet whereby movement in one direction opens communication between the inlet and outlet and movement in the second direction closes communication between the inlet and the outlet. First and second pilot pistons are positioned in the body and of equal cross-sectional areas with one of the pistons positioned on one side of the valve element and the other of the pistons positioned on the second side of the valve element. First and second pilot ports extend into the body for admitting fluid behind the first and second pistons, respectively, for moving the valve to either an open or closed position. Third and fourth pilot pistons are positioned in the body and of unequal cross-sectional areas with the third piston positioned on one side of the valve element and the fourth piston positioned on the second side of the valve element. Third and fourth pilot ports extend into the body for admitting fluid behind the third and fourth pistons, respectively, for moving the valve to either an open or closed position. The control valve thus controls hydraulic fluid to an underwater device by actuation of control fluid through either the first set of pilot ports, that is, first and second pilot ports, or through the second set of pilot ports, the third and fourth pilot ports.

Yet a still further object of the present invention is the provision of an electrical and hydraulic control system for actuating the control valve which includes a hydraulic control system which supplies hydraulic fluid to the inlet of the control valve and which is connected to the third and fourth pilot ports of the valve for controlling the actuation of the control valve. An electrical control system includes electrically actuated valve means which, when actuated, deactuates the hydraulic control means and selectively supplies fluid to either the first and second pilot ports of the control valve.

Still a further object of the present invention is the provision of an electrical and hydraulic control system for actuating the control valve. The hydraulic control system includes a first hydraulic manifold connected to the third pilot ports of the control valves and a second hydraulic manifold is connected to the fourth pilot ports of each of the control valves. By selectively actuating the hydraulic pressure in the manifolds, the control valves can be selectively actuated. The electrical control system includes a first electrical actuated valve means which, when actuated, closes a pilot valve positioned upstream of the third and fourth pilot ports to deactuate the hydraulic control system and also includes a plurality of additional electrically actuated valve means connected to each of the first and second ports of each of the control valves.

Other and further objects, features and advantages will be apparent from the following description of a presently preferred embodiment, given for the purpose of disclosure, and taken in conjunction with the accompany drawings.

DESCRIPTION OF THE PREFERRED EMBODIMENT

Figure 1A:
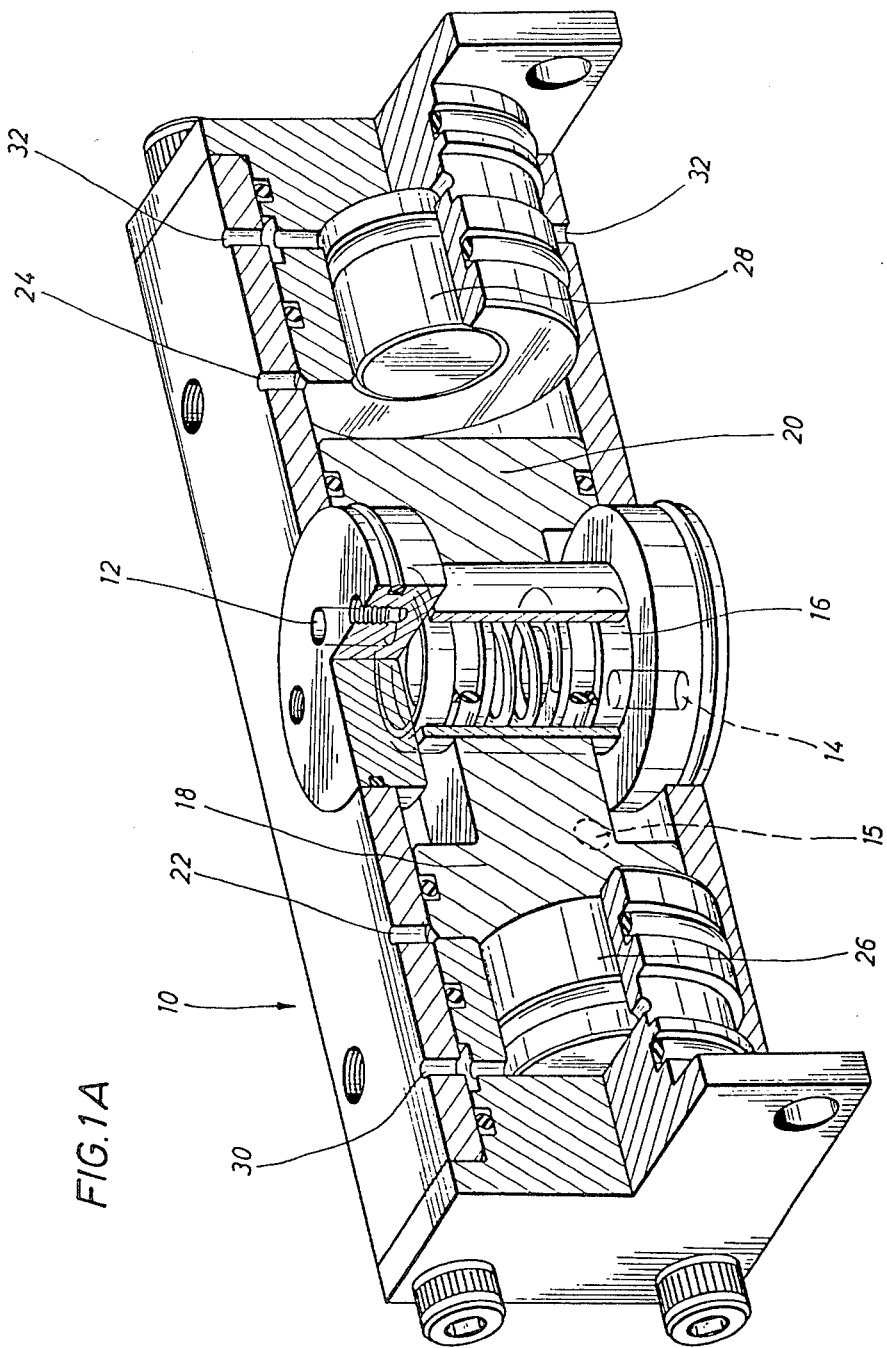
FIG. 1A is a perspective elevational view, partly in cross section, of the hydraulic control valve of the present invention.
Figure 1B:
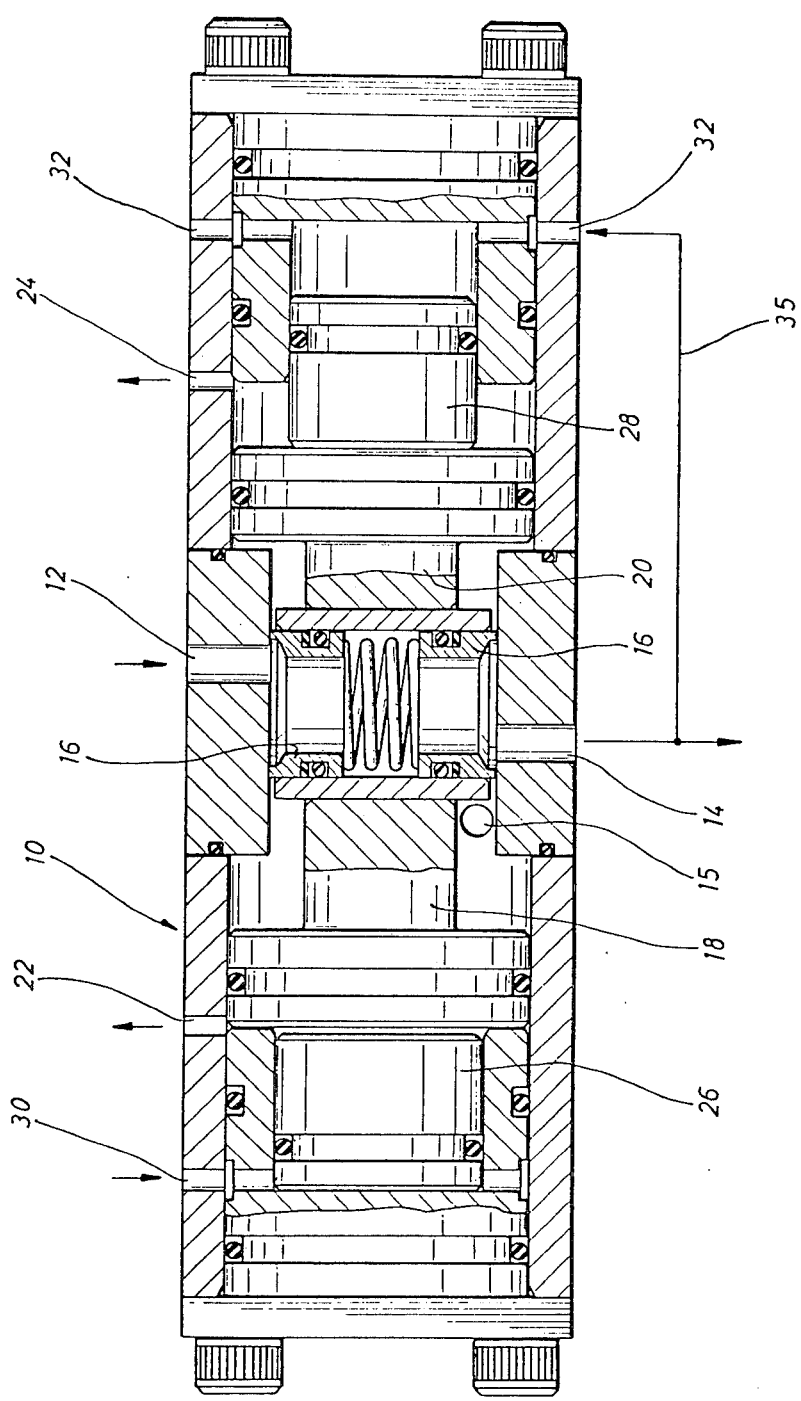
FIG. 1B is an elevational view, in cross section, of the valve of FIG. 1A shown in the open position.
Figure 1C:
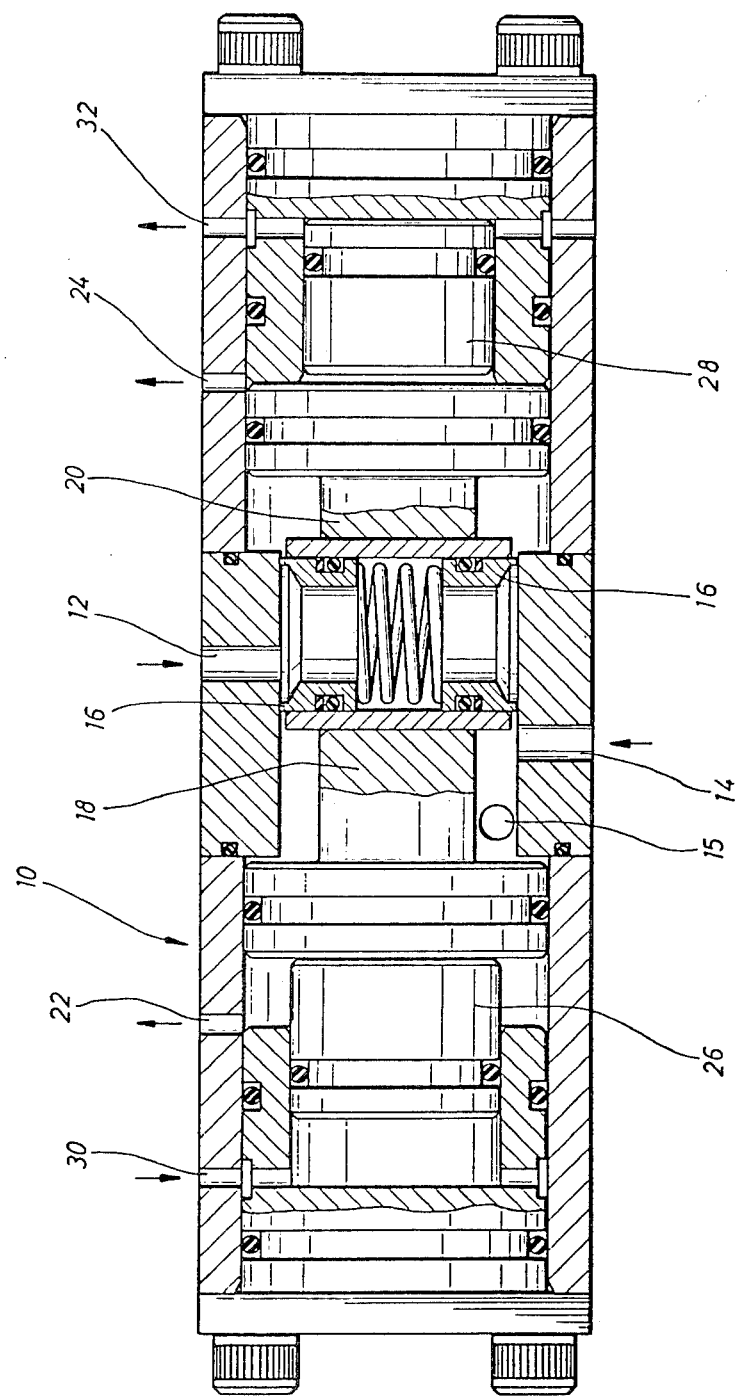
FIG. 1C is an elevational view, in cross section, of the valve of FIG. 1A shown in the closed position.

Referring now to FIGS. 1A, 1B and 1C, the reference numeral 10 generally indicates the hydraulic control valve of the present invention and includes an inlet 12 and an outlet 14. A conventional shear seal valve element 16 is movably positioned between the inlet 12 and the outlet 14 to allow communication between the inlet 12 and the outlet 14 as best seen in FIG. 1B, or to block communication between the inlet 12 and the outlet 14, as best seen in FIG. 1C, and provide communication between the outlet 14 and a vent port 15.

There are two separate and independent pilot pistons at each end of the valve 10 on opposite side of the valve element 16. The first set of pilot pistons 18 and 20 are of equal cross-sectional areas and are positioned on opposite sides of the valve element 16 and preferably adjacent thereto. Pilot piston 18 is in communication with a pilot port 22 and when hydraulic fluid is transmitted through port 22 against the backside of the piston 18, the valve element 16 is moved to the closed position, as shown in FIG. 1C. The second pilot piston 20 is in communication with a pilot port 24 and when fluid is transmitted through port 24 against the backside of the piston 20, the piston 20 moves the valve element 16 to the open position, as best seen in FIG. 1B.

In addition, a third piston 26 and a fourth piston 28 are provided in the body of the valve 10 on opposite sides of the valve element 16. The pilot pistons 26 and 28 have unequal cross-sectional areas such as the pilot piston 26 having the larger cross-sectional area, as shown in the example in FIGS. 1A, 1B and 1C. Pilot piston 26 is in communication with a port 30 for supplying hydraulic fluid to the back of piston 26 for its actuation against the first piston 18 for moving or holding the valve 10 in the closed position. Similarly, the pilot piston 28 is in communication with a port 32 which supplies actuating fluid to the backside of the pilot piston 28 for moving the valve element 16 to the open position.

There are several different control modes that can be used to shift the valve. Many of these control modes can be used in conjunction with another control mode within the same overall system. A few of these control modes are:

(1) Programmed Hydraulics— the valve is caused to shift at a predetermined pressure level.

(2) Electro-Hydraulic— the valve is caused to shift by energizing an electric solenoid operated pilot valve.

(3) Discrete Hydraulic Pilot— the valve is caused to shift by using discretely controlled hydraulic signals.

(4) Electro-Hydraulic with Hydraulic Latching— the valve is caused to shift through electric solenoid operated pilot valves and hydraulically latched in the shift position.

The valve 10 can be assembled to operate as a normally open valve or normally closed valve. The valve can be operated as a fail-safe valve.

For example, in programmed hydraulics, the valve element 16 is shifted at a predetermined pressure level applied to one of the outer pilot pistons 26 or 28 while maintaining a constant pressure on the other pilot piston. This is accomplished since the areas of the two pilot pistons 26 and 28 are unequal. In the electro-hydraulic mode, the valve is shifted by energizing an electric solenoid pilot valve to one or other of the ports 22 and 24 against the equal size pilots 18 or 20. If hydraulic latching is desired, a line connection 35 is made as shown in FIG. 1B between the outlet 14 and the port 32 to apply the higher pressure supply fluid to the back of piston 28 to hold the valve hydraulically latched in the shift position.

Figure 2:
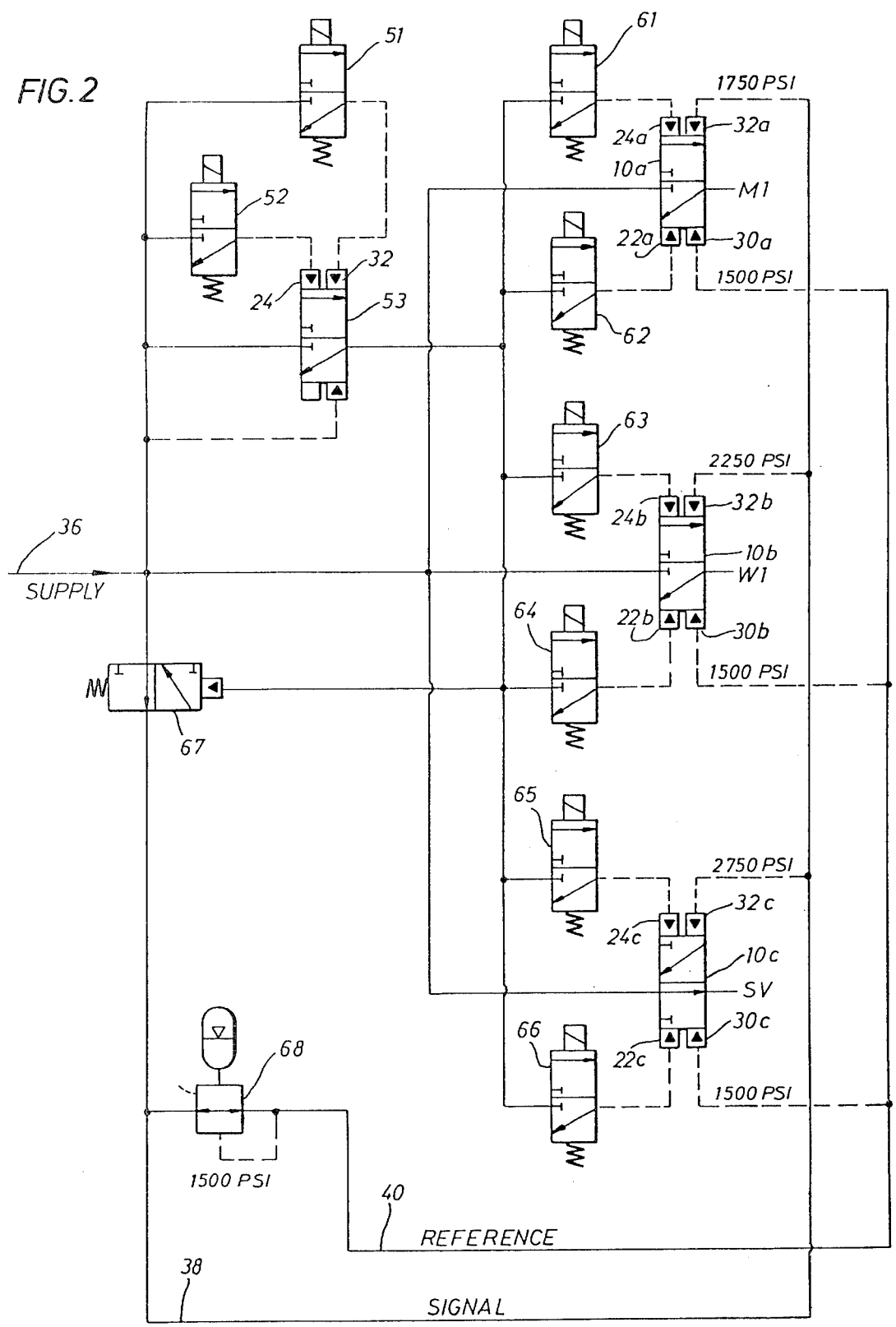
FIG. 2 is a schematic diagram of a control system controlling the valve of FIG. 1A in both an electrohydraulic control mode and a hydraulic control mode.

Referring now to FIG. 2, an underwater control system is utilized using three control valves similar to valve 10 described in FIGS. 1A, 1B and 1C for hydraulically controlling underwater equipment such as valves on a subsea oil well production. Thus, valve 10a may control the actuation of a master valve (M1). The valve 10b may control the actuation of a wing valve (W1), and valve 10c may control the actuation of a subsurface safety valve (SV) as more fully described in U.S. Pat. No. 3,993,100. The valves 10a, 10b and 10c are similar to each other and to valve 10, except that the ratio of cross-sectional areas of piston 26 to piston 28 in the valves 10a, 10b and 10c, is varied, and valve 10c is a normally opened valve as will be more fully described hereinafter.

In the control system shown in FIG. 2, only a single hydraulic supply line 36 need be utilized, if desired, for supplying hydraulic fluid for the actuation of the underwater valves 10a, 10b and 10c.

The primary control system is the electro-hydraulic control mode and electrical power (not shown) is supplied from the surface for controlling electrical valves, such as solenoid valves. The first function of the electro-hydraulic control mode is to activate the electro-hydraulic control mode and deactuate the hydraulic control mode. Thus, electrical power is applied and maintained on either solenoid valves 51 and 52 which in turn applies pilot pressure to valve 53 to open valve 53. Valve 53 is similar to control valve 10, but with the piston 26 being larger than the pilot piston 28. While valves 52 and 53 may be omitted, two electrical activating valves 51 and 52 are used for redundancy and hydraulic valve 53 is used as it is generally allows a greater fluid flow than pilot valves 51 and 52. With valve 53 open, hydraulic pressure is supplied to the supply ports of solenoid actuated valves 61, 62, 63, 64, 65 and 66 and the hydraulic pilot of valve 67 which closes valve 67. With valve 67 closed, hydraulic pressure from supply line 36 will be absent from the hydraulic control system mode, and the hydraulic control mode is thus deactuated.

By electrically energizing solenoid pilot valve 61, pilot pressure is supplied to port 24a of valve 10a, causing it to open and allow pressure to flow to actuated function M1 as explained in connection with the description of FIG. 1. After valve 10a is shifted to the open position, solenoid pilot valve 61 may be de-energized by removing and conserving electrical power. Valve 10a will remain in the open position, since there is no pilot pressure applied to either the ports 22a or 30a to cause the valve 10a to shift to the closed position. Valve 10a can be closed at any time by electrically energizing solenoid valve 62 and pilot pressure is supplied to port 22a of a valve 10a causing it to close and allow pressure to be bled from function M1 as described in the description of FIG. 1. After valve 10a has shifted to the closed position, valve 62 can be deenergized by removing the electrical power from the solenoid valve 62. Valve 10a will remain in the closed position since there is no pilot pressure applied to either ports 24a or 32a to cause the valve 10a to shift to the open position. By electrically operating solenoid valves 63 and 64, valve 10b can be shifted in the same manner as described in connection with valve 10a. Similarly, valve 10c may be shifted in a similar way as valves 10a and 10b by actuation of solenoid pilot valves 65 and 66.

The above description describes the operation of the control valves 10a, 10b and 10c by an electro-hydraulic control mode which is desirable since the electrical transmission of signals from above the water surface to the desired solenoid pilot control valve provides a fast mode of operation. However, in the event of a failure in the electrical-hydraulic control mode, a programmed hydraulic control mode can be utilized by removing all electrial power and by setting the surface supply pressure in line 36 equal to the designated reference pressure. The removal of electrical power will cause valve 53 to vent or close and bleed the hydraulic pilot pressure from valve 67. Valve 67 will then open and establish equal pressure on both the signal line 38 and the reference line 40 and an equal pressure on both the signal pilot pistons 28 and the reference pilot pistons 26 of the valves 10a, 10b and 10c. Valve 68 will maintain a constant reference pressure, for example, 1500 psi while the signal pressure in line 38 may be increased to the required levels for actuation of the valves 10a, 10b and 10 c. By applying equal pressure on both the signal pilot pistons 28 and the reference pilot pistons 26, valves 10a, 10b and 10c are automatically shifted to the closed position because of the greater cross-sectional area of the reference pilot pistons 26, regardless of the position that was accomplished electrically. The pressure levels used in this example are for illustration purposes only to show the relationship of reference and signal pressure requirements for actuation of the valves 10a, 10b and 10c. With valve 68 adjusted to maintain a constant 1500 psi pressure in reference line 40 and on the reference pilot pistons 26, the signal pressure is raised through supply line 36 and thus to signal line 38 to 1750 psi. The cross-sectional area of the pilot piston 28 to the pilot piston 26 in valve 10a is such that valve 10a will shift to the open position upon the application of 1750 psi to its pilot piston 28. However, the cross-sectional areas of the pilot pistons 28 and 26 in valves 10b and 10c are such that valve 10b remains in its normal closed position and valve 10c remains in its normal open position. However, in valve 10b the relative cross-sectional size of pilot piston 28 to pilot piston 26 is such that on a further increase of signal pressure to 2250 psi, valve 10b will shift to the open position, valve 10a remains in the open position, but valve 10c still remains in its normal open position. The relative size of pilot piston 28 to pilot piston 26 in valve 10c is such that upon increasing the signal pressure to 2750 psi, valve 10c will shift to the closed position while valves 10a and 10b will still remain in the open position.

By reducing the signal pressure in line 38, the valves 10a, 10b 10c will return to their normal position in reverse order; that is, valve 10c will shift to its normally open position when the signal pressure is reduced below 2750 psi, valve 10b will shift to its normally closed position when the signal pressure is reduced below 2250 psi, and valve 10a will shift to its normal closed position when the signal pressure is reduced below 1750 psi.

The present invention, therefore, is well adapted to carry out the object and attain the ends and advantages mentioned as well as other inherent therein. While a presently preferred embodiment of the invention is given for the purpose of disclosure, numerous changes in the details of construction and arrangement of parts will readily suggest themselves to those skilled in the art and which are encompassed within the spirt of the invention and the scope of the appended claims.

What is claimed:

1. An electrical and hydraulic control system for controlling a plurality of hydraulically actuated underwater devices comprising:
    a control valve for controlling each of said devices including,
        a valve body, said body having an inlet and an outlet,
        a valve element movably positioned between the inlet and the outlet whereby movement in one direction opens communication between the inlet and outlet and movement in a second direction closes communication between the inlet and the outlet,
        first and second pilot pistons positioned in the body and of equal cross-sectional areas, one of the pistons is positioned on one side of the valve element and the other of which is positioned on the second side of the valve element,
        first and second pilot ports extending into said body for admitting fluid behind the first and second pistons, respectively, for moving the valve to either an open or closed position,
        third and fourth pilot pistons positioned in said body and of unequal cross-sectional areas, said third piston positioned on one side of the valve element, and the fourth piston positioned on the second side of the valve element,
        third and fourth pilot ports extending into said body for admitting fluid behind the third and fourth pistons, respectively, for moving the valve to either an open or closed position,
    a first hydraulic manifold connected to the third pilotports of the control valves,
    a second hydraulic manifold connected to the fourth pilot ports of each of the control valves,
    first electrically actuated valve means having an inlet and an outlet with the inlet connected to the hydraulic fluid line, said valve being open when electrically actuated and closed when electrically deactuated,
    a pilot valve having an inlet and an outlet and connected to the hydraulic manifold upstream of the third and fourth pilot ports, said pilot actuated by the first electrical actuated valve means for moving the pilot valve to the closed position when the first electrically actuated valve is electrically actuated,
    a plurality of additional electrically actuated valve means each having an inlet and an outlet, the inlets of each of the additional valves being connected to the outlet of the first electrically actuated valve means, and the outlets of each additional valve being connected to one of the first and second pilot ports of each of the control valves, said additional valves being open when electrically actuated and closed when electrically deactuated.

2. The apparatus of claim 1 wherein the electrically actuated valve means include a solenoid valve.

3. Apparatus including an electrical and hydraulic control system for actuating a control valve,
    said control valve comprising
        a valve body having an elongate chamber, and an inlet and an outlet communicating with said chamber,
        a valve element longitudinally movably positioned in said chamber between the inlet and the outlet whereby movement in one direction opens communication between the inlet and the outlet and movement in the other direction closes communication between the inlet and the outlet,
        first and second pilot pistons positioned in said chamber and of equal cross-sectional areas, said first piston being positioned longitudinally on one side of the valve element and said second piston being positioned longitudinally on the other side of the valve element,
        first and second pilot ports extending into said chamber for admitting fluid behind the first and second pistons, respectively, for moving the valve element to either an open or closed position,
        third and fourth pilot pistons positioned in said chamber and of unequal cross-sectional areas less than the cross-sectional area of said first and second pistons, said third piston being positioned on said one side of the valve element and at least partially longitudinally outwardly of said first pilot port, and the fourth piston being positioned on said other side of the valve element and at least partially longitudinally outwardly of said second pilot port,
        third and fourth pilot ports extending into said chamber for admitting fluid behind the third and fourth pistons, respectively, for moving the valve to either an open or closed position,
    and said apparatus further including— a hydraulic fluid line connected to the inlet of said control valve and to the third and fourth pilot ports of said valve, a first electrically actuated valve means having an inlet and an outlet with the inlet connected to the hydraulic fluid line, said valve being open when electrically actuated and closed when electrically deactuated, a pilot valve having an inlet and an outlet and connected in hydraulic fluid line upstream of said third and fourth pilot ports, said pilot actuated by the first electrically actuated valve for moving the pilot valve to the closed piston when the first electrically actuated valve is electrically actuated, second and third electrically actuated valve means having an inlet and an outlet, said inlet being connected to the outlet of the first electrically actuated valve means and the outlets connected to the first and second pilot ports, respectively, of the control valve, said valves being open when electrically actuated and closed when electrically deactuated.

* * * * *